(12) United States Patent
Fisk et al.

(10) Patent No.: US 11,998,862 B2
(45) Date of Patent: Jun. 4, 2024

(54) SAMPLE PREPARATION DEVICES, KITS AND METHODS

(71) Applicant: Waters Technologies Corporation, Milford, MA (US)

(72) Inventors: Raymond P. Fisk, Norton, MA (US); Timothy J. Becker, Attleboro, MA (US); Mary Elizabeth Lame, Uxbridge, MA (US); Frank John Marszalkowski, Cumberland, RI (US); Matthew A. Lauber, North Smithfield, RI (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 18/179,835

(22) Filed: Mar. 7, 2023

(65) Prior Publication Data

US 2023/0201744 A1    Jun. 29, 2023

Related U.S. Application Data

(63) Continuation of application No. 16/182,401, filed on Nov. 6, 2018, now abandoned.

(Continued)

(51) Int. Cl.
*B01L 3/00*       (2006.01)
*B01D 15/12*      (2006.01)
(Continued)

(52) U.S. Cl.
CPC ......... *B01D 15/3809* (2013.01); *B01D 15/12* (2013.01); *B01D 15/14* (2013.01);
(Continued)

(58) Field of Classification Search
CPC .... B01D 15/3809; B01D 15/12; B01D 15/14; B01D 15/22; B01D 15/424; B01L 3/5023;
(Continued)

(56) References Cited

U.S. PATENT DOCUMENTS 6,566,145 B2   5/2003  Brewer
6,723,236 B2   4/2004  Fisk et al.
(Continued)

FOREIGN PATENT DOCUMENTS

WO      2016100447 A1      6/2016

OTHER PUBLICATIONS

Altintas, Z., et al., "Detection of waterborne viruses using high affinity molecularly imprinted polymers", Analytical Chemistry, 87, pp. 6801-6807. (Year: 2015).*

(Continued)

*Primary Examiner* — Benjamin L Lebron
(74) *Attorney, Agent, or Firm* — Womle Bond Dickinson; Deborah M. Vernon; Ricardo Joseph

(57) ABSTRACT

The present disclosure pertains to sample preparation devices useful for affinity capture and purification that include one or more internal structures that comprise a reservoir, a well, a fluid passageway, sorbent particles, and a filter element that blocks passage of the affinity sorbent particles, which sample preparation devices combine the attributes of both dispersive and flow through designs into a single sample preparation device. The present disclosure also pertains to kits that contain and methods that use such sample preparation devices.

5 Claims, 1 Drawing Sheet

Related U.S. Application Data

(60) Provisional application No. 62/583,165, filed on Nov. 8, 2017.

(51) Int. Cl.
*B01D 15/14* (2006.01)
*B01D 15/22* (2006.01)
*B01D 15/38* (2006.01)
*B01D 15/42* (2006.01)
*B01L 3/02* (2006.01)

(52) U.S. Cl.
CPC .......... *B01D 15/22* (2013.01); *B01D 15/424* (2013.01); *B01L 3/5023* (2013.01); *B01L 3/0275* (2013.01); *B01L 3/5021* (2013.01); *B01L 2200/0631* (2013.01); *B01L 2200/0668* (2013.01); *B01L 2300/0681* (2013.01); *B01L 2300/069* (2013.01); *B01L 2400/0409* (2013.01); *B01L 2400/0433* (2013.01)

(58) Field of Classification Search
CPC ................ B01L 3/0275; B01L 3/5021; B01L 2200/0631; B01L 2200/0668; B01L 2300/0681; B01L 2300/069; B01L 2400/0409; B01L 2400/0433
See application file for complete search history.

(56) References Cited

U.S. PATENT DOCUMENTS

| | | |
|---|---|---|
| 6,770,246 B1 | 8/2004 | Husek |
| 7,999,084 B2 | 8/2011 | Jones |
| 8,158,064 B2 | 4/2012 | Fulton et al. |
| 2004/0166589 A1 | 8/2004 | Fisk et al. |
| 2005/0016921 A1 | 1/2005 | Gjerde et al. |
| 2007/0251885 A1* | 11/2007 | Korpela ........... G01N 33/54326 210/222 |
| 2008/0210614 A1 | 9/2008 | Gilar et al. |
| 2012/0164750 A1* | 6/2012 | Gjerde ................. G01N 1/405 436/178 |
| 2015/0011016 A1 | 1/2015 | Brewer |

OTHER PUBLICATIONS

International Search Report and Written Opinion issued in International Patent Application No. PCT/US2018/059491 dated Jan. 25, 2019.

United Filtration Systems. "Sintered polyethylene (PEL) elements for liquid service." Jul. 8, 2020.

* cited by examiner

SAMPLE PREPARATION DEVICES, KITS AND METHODS

RELATED APPLICATIONS

This application is a continuation of U.S. application Ser. No. 16/182,401 filed Nov. 6, 2018, which claims priority to and benefit of U.S. provisional application No. 62/583,165 filed Nov. 8, 2017. The contents of both applications are incorporated herein by reference in their entirety.

BACKGROUND

Affinity chromatography is a well-established method for the capture and purification of biological samples such as immunoglobulins, polyclonal and monoclonal antibodies and antibody fragments. Samples may be, for example, from native or recombinant sources, and may be contained in a variety of sample matrices including, for example, human and animal whole blood, plasma and serum samples, and cell culture supernatants. Common chromatographic sorbents used for isolation and purification by affinity capture are typically crosslinked agarose or polymer-based porous particles, to which an affinity capture protein is covalently attached. Common examples include Protein A and Protein G based sorbents which have utility in capturing and purifying samples from various animal species during drug development, manufacture, and bioanalytical testing.

A typical affinity purification procedure involves multiple steps. For example, the procedure may include a first step, which is to wash the sorbent particles with a binding buffer that enhances binding of the target analyte to the affinity sorbent. This is typically a phosphate buffered saline solution near pH 7. The sample is then introduced and target analytes are bound to the sorbent particles. After binding, the sorbent particles are washed with additional buffer to remove unbound substances while leaving the target analytes bound to the sorbent particles. An elution step is then conducted, commonly at a lower pH, to release and collect the purified target analyte for further measurement and characterization.

There are a number of device formats and methods used for affinity capture and purification, depending on the goal of the separation. At process scale, this usually involves a preparative scale packed chromatographic column onto which crude samples are injected. Process scale columns can generally be regenerated and reused. For analytical isolation and subsequent analysis and quantification, much smaller scale devices have been developed. These generally use affinity sorbents similar to those used in process scale work, but are contained in lab scale, disposable and often single-use devices.

These devices can be generally classified into two types—dispersive devices and flow through devices. Dispersive devices have evolved to include various formats. In a dispersive device, a succession of buffers and samples containing target analytes are slurried with the sorbent particles and allowed to equilibrate. Agitation may be supplied by shaking, stirring, or capping/inverting the device for the required time, after which the particles and fluid are separated before proceeding to the next step. Separation is generally achieved by filtration, by centrifugation or, if magnetic sorbent beads are used, by drawing the beads towards a magnet and removing the liquid portion. A disadvantage of dispersive devices is that the elution steps are typically inefficient, resulting in higher elution volume and thus lower concentration of the purified sample. An advantage of the dispersive approach is that the contact time during binding, washing and elution can be easily controlled.

Flow through devices can be viewed as small scale chromatographic columns. Samples, along with wash and elution buffers, are typically pumped through the devices at predetermined flow rates. In the case of automated robotic systems, the pump may be, for example, in the form of a programmable syringe pump. HPLC chromatography systems may also be used. The flow rate is generally carefully controlled, as binding, washing, and elution kinetics are typically time dependent. For example, if a sample is passed through the device too quickly, incomplete binding may occur, resulting in sample breakthrough and loss into the flow thru fraction. In this regard, the sample loading step is commonly the most susceptible to this phenomenon. Flow through devices typically contain relatively long and narrow sorbent beds. An advantage of this bed geometry is that, much like a small HPLC column, it allows for efficient sample elution using a relatively small volume of elution fluid. Low elution fluid volumes are advantageous for increasing purified sample concentration for further analysis or processing. A disadvantage of flow through devices is that extra equipment is typically required to control flow. Moreover, at optimal binding flow rates, sample loading time can be long.

The present disclosure combines the attributes of both dispersive and flow through designs into a single sample preparation device.

SUMMARY

In certain aspects, the present disclosure pertains to sample preparation devices that comprise an internal structure that comprises a reservoir, a well, a fluid passageway, sorbent particles, and a filter element that blocks passage of the affinity sorbent particles. More particularly, in the sample preparation devices of the present disclosure: (a) the reservoir has a volume, a first end and a second end, the first end having a first opening for receiving fluids, and the second end having a second opening that opens into the well; (b) the well has a volume, a length, a first end closest to the reservoir, a second end closest to the fluid passageway, and a first internal width at its first end that is greater than a second internal width at its second end; (c) the fluid passageway has a first end closest to the well and a second end comprising an outlet; (d) the filter element is positioned at the first end of the fluid passageway; (e) the affinity sorbent particles form a sorbent bed within the well, with the sorbent bed being positioned adjacent to the filter element and at least partially filling the well; and (f) there is no filter element positioned between the reservoir and the well that blocks passage of the affinity sorbent particles.

In various embodiments, which may be used in conjunction with any of the above aspects and embodiments, the well may be a tapered well that has, for example, a single taper angle, multiple taper angles with discrete transitions therebetween, or a continuous change in taper angle.

In various embodiments, which may be used in conjunction with any of the above aspects and embodiments, the well may be a tapered well that comprises a taper angle that ranges from 10 degrees or less to 70 degrees or more relative to a longitudinal axis of the well, for example, ranging from 10 to 15 to 20 to 25 to 30 to 35 to 40 to 45 to 50 to 55 to 60 to 65 to 70 degrees relative to a longitudinal axis of the well (in other words, the taper angle, relative to a longitudinal axis of the well, may range between any two of the preceding thirteen values).

In various embodiments, which may be used in conjunction with any of the above aspects and embodiments, the well may have a hollow partial conical shape or a hollow partial pyramidal shape.

In various embodiments, which may be used in conjunction with any of the above aspects and embodiments, the first internal width of the well may range from 2 times or less to 30 times or more (e.g., ranging from 2 to 5 to 10 to 15 to 20 to 25 to 30 times) the second internal width of the well.

In various embodiments, which may be used in conjunction with any of the above aspects and embodiments, the first internal width of the well may range from 2 mm or less to 30 mm or more (e.g., the first internal width of the well may range from 2 to 5 to 10 to 15 to 20 to 25 to 30 mm) and the second internal width of the well may range from 1 mm or less to 5 mm or more (e.g., the second internal width of the well may range from 1 to 2 to 3 to 4 to 5 mm).

In various embodiments, which may be used in conjunction with any of the above aspects and embodiments, the well may be configured such that the sorbent bed can be suspended in a fluid using a technique selected from shaking on a shaker device, vortex mixing, and aspirating and dispensing using a pipette, among other possibilities.

In various embodiments, which may be used in conjunction with any of the above aspects and embodiments, the length of the well may range from 2 times or less to 20 times or more the second internal width (e.g., the length of the well may range from 2 to 3 to 4 to 5 to 7 to 10 to 15 to 20 times the second internal width).

In various embodiments, which may be used in conjunction with any of the above aspects and embodiments, a total volume of the sorbent bed may range from 2 $\mu$L or less to 100 $\mu$L or more (e.g., ranging from 2 to 5 to 10 to 15 to 20 to 25 to 30 to 50 to 75 to 100 $\mu$L).

In various embodiments, which may be used in conjunction with any of the above aspects and embodiments, a total volume of the sorbent bed may range from 2 to 100% of the volume of the well (e.g., ranging from 2% to 5% to 10% to 20% to 50% to 75% to 100% of the volume of the well).

In various embodiments, which may be used in conjunction with any of the above aspects, the reservoir may be in the shape of a hollow cylinder or a hollow polygonal prism.

In various embodiments, which may be used in conjunction with any of the above aspects and embodiment, the reservoir may be in the shape of a hollow cylinder having an internal diameter ranging from 2 mm or less to 30 mm or more, for example, ranging from 2 to 5 to 10 to 15 to 20 to 25 to 30 mm (in other words, the internal diameter may be said to range between any two of the preceding seven values).

In various embodiments, which may be used in conjunction with any of the above aspects and embodiments, the filter element may have a pore size ranging from 0.22 to 50 $\mu$m (e.g., ranging from 0.22 to 0.5 to 1 to 2 to 5 to 10 to 20 to 50 $\mu$m).

In various embodiments, which may be used in conjunction with any of the above aspects and embodiments, the filter element may be selected from a frit and a membrane filter, among other possibilities, for example, selected from a spherical frit, a cylindrical frit, and a circular membrane filter.

In various embodiments, which may be used in conjunction with any of the above aspects and embodiments, the filter element may be a hydrophobic filter element.

In various embodiments, which may be used in conjunction with any of the above aspects and embodiments, the fluid passageway may include, for example, a tapered exit spout or a Luer connection at the second end of the fluid passageway, among other configurations.

In various embodiments, which may be used in conjunction with any of the above aspects and embodiments, the (a) the first opening for receiving fluids may be capped prior to and/or during use, (b) the second end of the fluid passageway may be capped prior to and/or during use, or (c) both (a) and (b).

In various embodiments, which may be used in conjunction with any of the above aspects and embodiments, the affinity sorbent particles may range from 2 to 200 $\mu$m in diameter (e.g., ranging from 2 to 5 to 10 to 20 to 50 to 100 to 200 $\mu$m in diameter).

In various embodiments, which may be used in conjunction with any of the above aspects and embodiments, the affinity sorbent particles may be selected from crosslinked agarose particles, silica-based particles and polymer-based particles, among other compositions.

In various embodiments, which may be used in conjunction with any of the above aspects and embodiments, surfaces of the affinity sorbent particles may include at least one bound affinity ligand. For instance, the one or more affinity ligands may be selected from proteins, including immunoglobulin-binding proteins, antibodies, aptamers, affimers, inorganic metal complexes, small organic compounds, hydrophobic molecules, polymer imprinted materials, oligonucleotides, and oligosaccharides.

In various embodiments, which may be used in conjunction with any of the above aspects and embodiments, the device may comprise a plurality of the internal structures. For example, the device may be in the form of a multi-well strip, a multi-well plate, or a rack of individual pipette tips, among other possibilities.

In other aspects, the present disclosure is directed to kits that contain (1) a sample preparation device in accordance with any of the above aspects and embodiments and (2) one, two, three, four, five, six, seven, eight, nine, ten or more kit components selected from any of the following: (a) a buffer solution, (b) a washing solution, (c) an elution solution, (d) a sample diluent solution, (e) an antibody standard, (f) an enzyme, for instance, a deglycosylation enzyme, a protease enzyme (e.g., trypsin, chymotrypsin, glu-c, arg-c or IdeS (immunoglobulin degrading enzyme from *streptococcus*)), an endprotease enzyme, a rexoprotease enzyme, a exoglycosidase enzyme, or an endoglycosidase enzyme, (g) a surfactant, (h) a denaturant, (i) a chaoptrope, (j) a reducing agent (e.g., a reductant such as dithiothreitol (DTT) or tris(2-carboxyl)phosphine (TCEP)), (k) an alkylation reagent, (l) a labeling reagent, (m) an affinity ligand, (n) a sample tray and (o) a collection tray.

In further aspects, the present disclosure is directed to methods of performing affinity isolation and purification procedures that comprise: (a) adding a sample fluid comprising a target analyte to the reservoir of a sample preparation device in accordance with any of the above aspects and embodiments; (b) dispersing the affinity sorbent particles in the sample fluid for a time sufficient for the target analyte to bind to the affinity sorbent particles; (c) removing the sample fluid from the device through the second end of the fluid passageway, forming a settled bed of loaded affinity sorbent particles having bound target analyte; (d) adding a washing solution to the reservoir, the washing solution causing unbound substances to be removed from the loaded affinity sorbent particles in the settled bed, without removing the bound target analyte; (e) removing the washing fluid from the device through the second end of the fluid passageway, thereby removing unbound substances from the settled bed; (f) adding an elution fluid to the reservoir, the elution fluid causing the target analyte to become unbound from the loaded affinity sorbent particles in the settled bed; and (g) removing the elution fluid from the device through the second end of the fluid passageway, thereby removing purified target analyte from the settled bed.

In some embodiments, the affinity sorbent particles may be dispersed, for example, by shaking the device on a shaker device, by using a vortex mixer, or by repeatedly aspirating and dispensing the sample fluid and the affinity sorbent particles, among other techniques.

In various embodiments, which may be used in conjunction with any of the above aspects and embodiments, the sample fluid, the washing fluid, and the elution fluid may be removed from the device by centrifugation, by applying a vacuum to the second end of the fluid passageway, by applying a positive pressure to the first opening of the reservoir, or a combination thereof.

In various embodiments, which may be used in conjunction with any of the above aspects and embodiments, the settled bed volume may range from 2 µL to 100 µL, the sample fluid volume may range from 20 µL to 50 mL, the washing fluid volume may range from 50 µL to 1000 µL, and/or the elution fluid volume may range from 5 µL to 200 µL.

In various embodiments, which may be used in conjunction with any of the above aspects and embodiments, the methods may further comprise forming the affinity sorbent particles by adding a carrier fluid comprising an affinity ligand to activated support particles within the device, and dispersing the carrier fluid and the activated support particles for a time sufficient for the affinity ligand to bind to the activated support particles.

In various embodiments, which may be used in conjunction with any of the above aspects and embodiments, the methods may further comprise adding a conditioning buffer to the reservoir and removing the conditioning buffer from the device through the second end of the fluid passageway prior to adding the sample fluid.

DETAILED DESCRIPTION

Figure 1A:
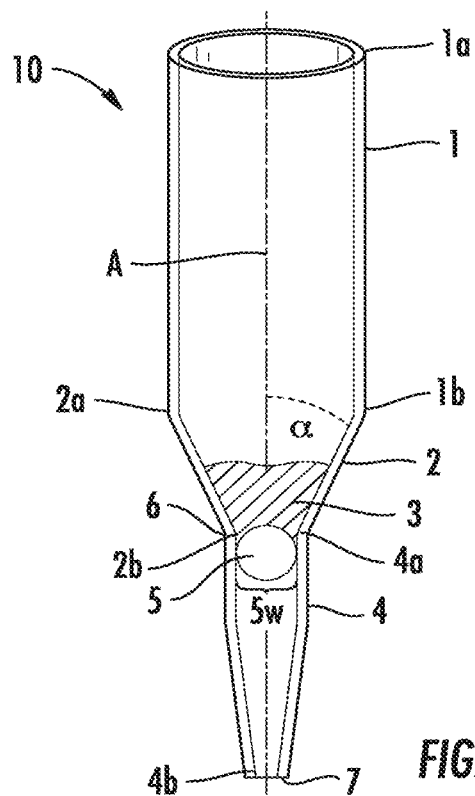
FIG. 1A is a schematic illustration of an internal structure of a device, in accordance with an embodiment of the present disclosure.
Figure 1B:
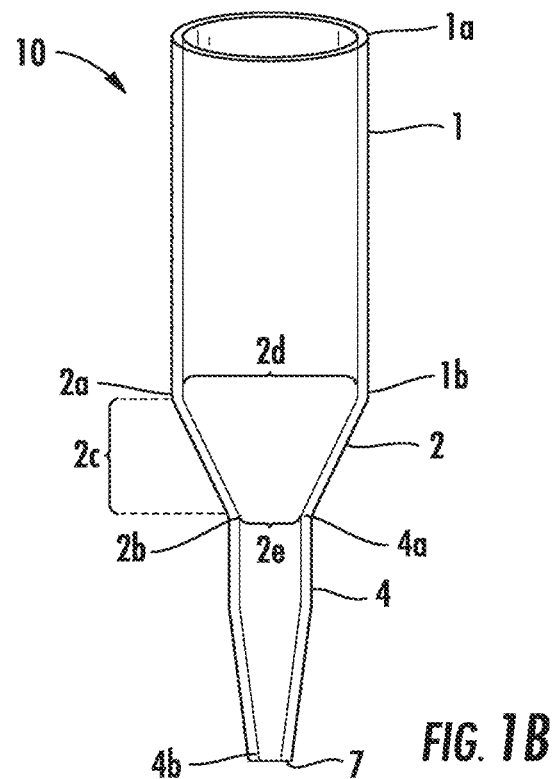
FIG. 1B is a schematic illustration of the internal structure of FIG. 1A, with sorbent bed and filter element removed.

With reference now to FIGS. 1A and 1B, in various aspects, the present disclosure pertains to an internal structure 10, which comprises a reservoir 1, a well 2, sorbent particles that collectively form a sorbent bed 3 which at least partially fills well 2, a fluid passageway 4, and a filter element 5 (FIG. 1B is an illustration of the internal structure 10 of FIG. 1A, without the sorbent bed 3 and filter element 5).

Reservoir 1 has a volume, a first end 1a and a second end 1b, the first end 1a having a first opening for receiving fluids and the second end 1b having a second opening that opens into well 2. Reservoir 1 is open at the first end 1a to accept sorbent particles, fluid samples and various other fluids including, for example, conditioning buffers, washing fluids, elution fluids, and so forth. Reservoir 1 may be straight-walled and may have, for example, a circular cross-section (e.g., a hollow cylinder), an oval cross-section, or a polygonal cross-section (e.g., in the form of a hollow polygonal prism having 3, 4, 5, 6, 7, 8 or more sides), among other possibilities. In particular embodiments, reservoir 1 may be in the shape of hollow cylinder having an internal diameter ranging between 2 and 30 mm, commonly having a diameter less than approximately 9 mm which allows for use in a multi well array consistent with Society for Biomolecular Screening (SBS) standard 96 well spacing. The top opening of the reservoir 1 may be adapted for sealing. For example, reservoir 1 may be provided with a screw thread, bead, flange, lip, other feature for accepting one or more caps (e.g., in the form of a snap-on cap, screw cap, sealing cap-mat, etc.) or other closure such as polymer film or metal foil.

Below the reservoir 1 is well 2. Well 2 has a volume, a length 2c, a first end 2a closest to the reservoir, and a second end 2b closest to fluid passageway 4. Well 2 has a first internal width 2d at its first end 2a that is greater than a second internal width 2e at its second end 2b. Well 2 volume may be tailored to the volume of sorbent particles that are desired. Well 2 is configured such that the sorbent particles of the sorbent bed 3 can be suspended in a given fluid (e.g., a sample fluid, washing fluid, etc.). The sorbent particles of the sorbent bed 3 may be suspended, for example, using a technique selected from shaking on a shaker device, vortex mixing, aspirating and dispensing using a pipette, capping followed by shaking and/or inverting, and so forth.

The angles and dimensions forming well 2 are selected to balance the ease of which particles can be dispersed upon mixing, against the desire to have an aspect ratio of the settled bed (length/width) be as high as possible. For a given bed volume, very steep angles will result in taller beds which are beneficial for efficient elution, but may make resuspension of sorbent particles more difficult, while larger angles produce shallower beds that are easier to suspend upon mixing, but will result in less efficient elution.

In various embodiments, well 2 is a tapered well, which may have, for example, a single taper angle α relative to a longitudinal axis A of the internal structure 10 as shown in FIG. 1A, or may have or multiple taper angles α relative to a longitudinal axis A. For example, well 2 may have multiple taper angles α with discrete transitions therebetween, or may have a continuous change in taper angle α (e.g., having an exponential flare). In certain embodiments, well 2 is a tapered well that comprises a taper angle α that ranges from 10 degrees to 70 degrees, relative to a longitudinal axis A. Well 2 may have, for example, an oval cross-section, a circular cross-section (e.g., having a hollow partial conical shape), or a polygonal cross-section (e.g., having a hollow partial pyramidal shape with 3, 4, 5, 6, 7, 8 or more sides).

With reference to FIG. 1B, in some embodiments, the first internal width 2d of well 2 may range from 2 to 30 times the second internal width 2e of well 2. In certain embodiments, the first internal width 2d of well 2 may range from 2 mm to 30 mm, while the second internal width 2e of well 2 may range from 1 mm to 5 mm. In some embodiments, the length 2c of well 2 may range from 2 to 20 times the second internal width 2e of well 2.

Materials for forming the reservoir 1, well 2 and passageway 4 may be selected from any suitable material that is inert to the samples and reagents used in affinity isolation and purification and are typically polymeric materials, examples of which include polyolefins such as polyethylene and polypropylene, cyclic olefins copolymers (e.g., those produced by copolymerization of ethylene with a cyclic olefin monomer such as norbornene, dihydro DCPD (dicyclopentadiene), phenyl norbornene and etracyclododecene, among others), or other polymers such as nylon, polyethylene terephthalate (PET), poly ether-ether ketone (PEEK), and polystyrene, among others Referring again to FIG. 1A, sorbent particles collectively form sorbent bed 3, which at least partially fills well 2. Volume of the sorbent bed 3 may vary widely depending on the device. For example, the volume of the sorbent bed 3 may range, for example, from 2 µL or less to 100 µL or more. In certain embodiments, the volume of the sorbent bed 3 may range from 2 to 100% of the volume of well 2.

Sorbent bed 3 may be made of a variety of affinity sorbent particles, which may be of various particle sizes, shapes, compositions and functionality. In certain embodiments, the affinity sorbent particles may range from 2 µm to 200 µm in diameter. Affinity sorbent particles may be, for example, polymer-based particles, silica-based particles or cross-linked agarose particles, among other possibilities. Affinity sorbent particles may contain immobilized affinity ligands bound to their surfaces. Examples of affinity ligands include proteins, including immunoglobulin-binding proteins, antibodies, aptamers, affimers, inorganic metal complexes, small organic compounds, hydrophobic molecules, polymer imprinted materials, oligonucleotides, and oligosaccharides. Particular examples of affinity ligands include Protein A, Protein G, Streptavidin, protein A/G (e.g., Pierce™ Recombinant Protein A/G, available from Thermo Fisher Scientific, Waltham, MA USA), engineered recombinant protein comprised of repeat subdomains of protein A (available, for example, as TOYOPEARL AF-rProtein A HC-650F from Tosoh Bioscience LLC, King of Prussia, PA USA), genetically engineered constructs of any of the above with 1 to 3 mutations to improve stability and/or activity, avidin, primary antibodies, secondary antibodies, primary antibodies connected non-covalently and/or covalently to secondary antibodies, boronate or boronic acid (e.g., Pierce™ Boronic Acid Resin available from Thermo Fisher Scientific, Waltham, MA USA), and lectins (e.g., immobilized affinity chromatography resins with immobilized lectins available from GE Healthcare Life Sciences, Marlborough, MA USA), among others.

Below well 2, is fluid passageway 4, which has a first end 4a closest to well 2 and a second end 4b comprising an outlet 7. Filter element 5 is positioned at the first end 4a of fluid passageway 4. Sorbent bed 3 is positioned adjacent to the filter element 5. Filter element 5 blocks affinity sorbent particles of the sorbent bed 3 from exiting the internal structure 10 through the passageway 4 and outlet 7. In the embodiment shown in FIG. 1A, filter element 5 is positioned at the first end 4a of fluid passageway 4, just below a transition region 6 where well 2 transitions into the fluid passageway 4. In this way, sorbent particles do not become entrapped in the narrow fluid passageway 4 and become difficult to disperse. There is no filter element positioned between the reservoir 1 and well 2, which would otherwise hinder affinity sorbent particles of the sorbent bed 3 from being resuspended in a fluid, when desired by a user.

Width 5w (e.g., diameter) of the filter element 5 may be tailored to achieve desired device flow properties. For example, smaller filter element widths 5w will reduce flow and also help to minimize elution volume. Pore size and porosity of the filter element 5 may also be tailored to block the passage of sorbent particles of sorbent bed 3, while achieving desired device flow properties. In certain embodiments, the pore size of the filter element 5 may range from 0.22 µm to 50 µm.

The filter element 5 may be, for example, a frit, which may be, for example, generally spherical in shape as illustrated in FIG. 1A or generally cylindrical in shape. Other filter elements 5 may be employed as well, including, for example, a membrane filter. Filter element 5 may be, for example, press fit, or attached by other means such as adhesives, heat sealing or welding. Common filter element 5 materials include polymers such as polyolefin, polyether-ether-ketone (PEEK), nylon, or any other material compatible with biological samples and reagents used in affinity isolation and purification. In certain embodiments, a hydrophobic filter element 5 is formed from a fluorinated polymer, for example, polytetrafluoroethylene (e.g., sintered polytetrafluoroethylene frits or woven polytetrafluoroethylene membranes), or a partially fluorinated polyolefin (e.g., sintered or woven polyolefin that is partially fluorinated). These hydrophobic materials have the advantage of blocking flow of aqueous and other non-polar fluids through the device when no driving force such as centrifugation, vacuum or positive pressure is applied. This can be useful in preventing unwanted fluid drainage from the device when handling the device between steps in a separation protocol.

Outlet 7 may be provided in various configurations. For example, outlet 7 may be provided in the form of a tapered exit spout. For instance, a trapezoidal or semicircular internal exit spout geometry as described in U.S. Pat. No. 6,723,236 may be employed. Outlet 7 may also be configured for downstream connection to other devices or collection vessels. For example, outlet 7 may be provided in the form of a Luer connection.

In some embodiments (e.g., where the affinity sorbent particles are shipped wet), bottom opening of the outlet 7 may be adapted for sealing. For example, outlet 7 may be provided with a screw thread, bead, flange, lip, other feature for accepting one or more caps (e.g., in the form of a snap-on cap, screw cap, sealing cap-mat, etc.) or other closure such as a polymer film or metal foil.

In some embodiments, a single internal structure 10 may be provided within a single-well device. In some embodiments, multiple internal structures 10 may be provided within a multi-well device such as a multi-well strip (e.g., a 4, 8 or 12-well strip) or a multi-well plate (e.g., 48 or 96-well plate). Single devices may also be placed in a multi-well format such as a holding rack, where the user can select how many samples to process at once.

Various fluids may be removed from the internal structure 10, for example, by centrifugation, by applying a vacuum to the second end 4b of fluid passageway 4, by applying a positive pressure to the first opening 1a of reservoir 1, or a combination thereof.

In other embodiments, the present disclosure is directed to kits which include the devices such as those described herein. Such kits may include, for example, a device like that described above and one or more kit components selected from any of the following: (a) a conditioning buffer solution, (b) a washing solution, (c) an elution solution, (d) a sample diluent solution, (e) an antibody standard, (f) an enzyme, for example, a deglycosylation enzyme, a protease enzyme (e.g., trypsin, chymotrypsin, glu-c, arg-c or IdeS (immunoglobulin degrading enzyme from *Streptococcus*)), an endprotease enzyme, a rexoprotease enzyme, a exoglycosidase enzyme, or an endoglycosidase enzyme, (g) a surfactant, (h) a denaturant (i) a chaotrope, (j) a reducing agent (e.g., a reductant such as dithiothreitol (DTT) or tris(2-carboxyl) phosphine (TCEP)), (k) an alkylation reagent, (l) a labeling reagent, (m) an affinity ligand, (n) a sample tray and (o) a collection tray.

In other aspects, the present disclosure pertains to methods of performing affinity isolation and purification procedures. Typically, the methods include the following: (a) adding a sample fluid that comprising a target analyte to the reservoir 1 of a device having one or more internal structure(s) 10 like that described in FIG. 1A, (b) dispersing the affinity sorbent particles in the sample fluid for a time sufficient for the target analyte to bind to the affinity sorbent particles, (c) removing the sample fluid from the device through the fluid passageway 5, thereby forming a settled bed 3 of loaded affinity sorbent particles having bound target analyte, (d) adding a washing solution to the reservoir 1, the washing solution adapted to cause unbound substances to be removed from the loaded affinity sorbent particles in the settled bed 3, without removing the bound target analyte; (e) removing the washing fluid from the device through the fluid passageway 5, thereby removing the unbound substances from the settled bed 3, (f) adding an elution fluid to the reservoir 1, the elution fluid adapted to cause the target analyte to become unbound from the loaded affinity sorbent particles in the settled bed 3; and (g) removing the elution fluid from the device through the fluid passageway 5, thereby removing purified target analyte from the settled bed 3. In certain embodiments, the methods further comprise adding a conditioning buffer to the reservoir 1 prior to adding the sample fluid and removing the conditioning buffer from the device through the fluid passageway 5.

In an exemplary embodiment, a sample fluid containing an analyte of interest (e.g., human or animal whole blood, human or animal plasma, human or animal serum, a cell culture supernatant, etc.) may be added to the reservoir. The volume of the sample fluid will be related to the size of the device, with larger devices requiring greater sample volumes. For example, the sample fluid volume may range, for example, from sample fluid volume ranges from 20 µL or less to 50 mL or more (e.g., ranging from 20 µL to 50 µL to 100 µL to 200 µL to 500 µL to 1 mL to 2 mL to 5 mL to 10 mL to 20 mL to 50 mL).

Sample binding to the affinity sorbent may then be carried out by dispersing the sorbent bed in the sample fluid. Dispersing of the sorbent particles may be performed, for example, by shaking the device on a shaker device, by using a vortex mixer, by repeatedly aspirating and dispensing the sample fluid and the affinity sorbent particles (e.g., using a robotic system or hand pipette), by capping and inverting and/or shaking the device, and so forth. In some embodiments, the dispersing occurs for a period of at least 5. After sufficient time for target analyte(s) to bind to the sorbent particles, the sample fluid is removed from the device, for example, using positive pressure, vacuum, or centrifugation. For instance, in some embodiments, the device may be placed on a vacuum manifold and the sample fluid is drawn through the fluid passageway to waste, thereby re-forming a settled bed of affinity sorbent particles containing bound target analyte(s).

A washing fluid may then be added to the reservoir 1. The washing solution is selected to cause unbound substances to be removed from the loaded affinity sorbent particles, without removing the bound target analyte(s). A variety of washing fluids may be employed so long as they are the washing fluids are effective to remove the unbound substances without causing the target analyte to become unbound from the loaded affinity sorbent particles. In certain embodiments, the washing solution may be a buffered saline solution having a pH ranging from 7 to 8 (e.g., tris(hydroxymethyl)aminomethane (TRIS) buffer, Phosphate Buffer combined with 0.1-1.5M NaCl, etc.). The volume of the washing fluid will be related to the size of the device, with larger devices requiring greater washing fluid volumes. In certain embodiments, the washing fluid volume may range, for example, from 50 µL or less to 1000 µL or more (e.g., ranging from 50 to 100 to 200 to 500 to 1000 µL). In some embodiments, the settled sorbent bed may be resuspended in the washing fluid prior to removing the washing fluid. In some embodiments, the washing fluid is simply passed through the settled sorbent bed without resuspension. In either case, the washing fluid may be removed from the device, for example, using positive pressure, vacuum, or centrifugation. In certain embodiments, more than one washing step may be employed.

When it is desired to remove the target analyte(s), the loaded affinity sorbent particles are exposed to an elution fluid which is selected to cause the target analyte to become unbound from the affinity sorbent particles. To minimize elution volume, and thus maximize the concentrate of target analyte(s), the elution fluid is typically flowed through the particles in the sorbent bed 3 without resuspension. A variety of elution fluids may be employed so long as the elution fluids are effective to cause the target analyte to become unbound from the affinity sorbent particles. In certain embodiments, the elution fluid may be a buffer solution, which may have a pH ranging from 1 to 4, or the elution fluid may be acidic solution (e.g., glycine-HCl, formic acid, trifluoroacetic acid (TFA), HCl combined with NaCl, acetic acid, phosphoric acid, etc.). The volume of the elution fluid will be related to the size of the device, with larger devices requiring greater elution fluid volumes. For example, the elution fluid volume may range, for example, from 5 µL or less to 200 µL or more (e.g., ranging from 5 µL to 10 µL to 20 µL to 50 µL to 100 µL to 200 µL). The elution fluid is passed through the sorbent bed 3 to a collection vessel. Elution fluid may be removed from the device, for example, using positive pressure, vacuum, or centrifugation, among other techniques. The purified sample is then ready for further analysis.

In certain embodiments, prior to adding the sample fluid, a conditioning buffer may be added to the reservoir 1 and removed to enhance target analyte binding. The conditioning buffer may be removed using techniques such as positive pressure, vacuum, or centrifugation, among others. In other embodiments, for example, where water-wettable sorbent particles are employed, no conditioning buffer is added prior to adding the sample fluid.

In certain embodiments, the methods described herein may further comprise forming affinity sorbent particles by adding a carrier fluid comprising an affinity ligand to activated support particles within the device, and dispersing the carrier fluid and the activated support particles for a time sufficient for the affinity ligand to bind to the activated support particles. Subsequently, the carrier fluid is removed from the device, for example, using techniques such as positive pressure, vacuum, or centrifugation as described above, among other possibilities.

As indicated above, in various embodiments, methods described herein may further comprise analyzing purified samples using analytical instruments and/or techniques, for example, liquid chromatography (LC), including high performance liquid chromatography (HPLC) and ultra-high performance liquid chromatography (UHPLC), mass spectrometry (MS), including electrospray ionization mass spectrometry (ESI-MS), matrix-assisted laser desorption/ionization mass spectrometry (MALDI-MS), time-of-flight mass spectrometry (TOFMS), nuclear magnetic resonance, infrared analysis, ultraviolet analysis, or a combination thereof.

For instance, in some embodiments, the processed samples may be analyzed using liquid chromatography, such as HPLC or UHPLC, in combination with mass spectrometry, such as MALDI-MS or ESI-MS, examples of which include liquid chromatography-mass spectrometry (LC-MS) techniques and liquid chromatography-mass spectrometry/mass spectrometry (LC-MS/MS) techniques. In certain cases, analytical samples may be evaporated to dryness, and then reconstituted in another solution before being injected into a liquid chromatography system.

A potential benefit of the devices, kits and methods of the present disclosure is that the concept of a self-forming bed, which provides high efficiency and low elution volume may be combined with a device geometry that is also amenable to dispersive sorbent/sample interaction. In this way, contact time can be controlled and optimized during those steps in an affinity capture and purification protocol which require lengthy periods of contact (e.g., when binding target analyte to the affinity sorbent particles), independent of flow through steps.

A further potential benefit of the present disclosure is that devices and methods may be provided which can easily be adapted to multiple work flows by the user, such as using either vacuum or positive pressure manifolds, centrifugation, manual or robotic mixing and pipetting methods, which are generally available in many laboratories, providing users a great deal of flexibility when processing samples.

EXAMPLE

This Example illustrates devices and methods in accordance with the present disclosure and illustrates the advantages of combining both dispersive and flow through elements into a single device.

A device as shown in FIG. 1 is constructed using a 2.5 mm diameter spherical polyethylene frit positioned just below the transition region 6 where well 2 transitions into the fluid passageway 4. The cone angle is 50 degrees, transitioning up to a cylindrical reservoir having an internal diameter of 7 mm. A 15 µL settled bed volume of 50 µm diameter polymeric Protein A affinity sorbent particles is contained in the conical section of the device, directly above the frit.

300 µL of pH 7 conditioning buffer is added to the reservoir, and drawn through the device using vacuum to form a settled conical bed, and to equilibrate the Protein A affinity sorbent prior to binding.

A 200 µL sample containing analyte of interest is then added to the reservoir. Sample binding to the affinity sorbent is carried out dispersively by placing the device onto a vortex shaker for 5 minutes, providing sufficient time for target analytes to completely bind to the sorbent beads. An alternative mixing method, if using a robotic system or hand pipette, is to aspirate and discharge the sample/sorbent mixture multiple times. The device is then returned to the vacuum manifold and the sample fluid is drawn through the device to waste, thereby re-forming the conical bed of affinity sorbent containing the bound target analyte.

500 µL of wash buffer is then added to the reservoir and passed through the sorbent bed using vacuum to wash all unbound interferences to waste.

Final elution of the purified analyte from the affinity sorbent is then carried out by passing 50-100 µL of a pH 2.5 elution buffer through the device to a collection vessel. The purified sample is then ready for further analysis.

The invention claimed is:

1. A method of performing an affinity isolation and purification procedure, the method comprising:
adding a sample fluid comprising a target analyte to a reservoir of a device that comprises an internal structure that comprises the reservoir, a well, a fluid passageway, sorbent particles, and a filter element that blocks passage of the affinity sorbent particles, wherein the affinity sorbent particles contain immobilized affinity ligands bound to their surfaces and the affinity ligands include polymer imprinted materials and oligosaccharides; the reservoir having a first volume, a first end and a second end, the first end having a first opening for receiving fluids and the second end having a second opening that opens into the well such that the well and the reservoir are directly adjacent to each other; the well having a second volume, a length, a first end closest to the reservoir, and a second end closest to the fluid passageway, the well having a first internal width at its first end that is greater than a second internal width at its second end; the fluid passageway having a first end closest to the well and a second end comprising an outlet; the filter element positioned at the first end of the fluid passageway; and the affinity sorbent particles forming a sorbent bed within the well, the sorbent bed being positioned adjacent to the filter element and at least partially filling the well; wherein there is no filter element positioned between the reservoir and the well that blocks passage of the affinity sorbent particles;
dispersing the affinity sorbent particles in the sample fluid for a time sufficient for the target analyte to bind to the affinity sorbent particles;
removing the sample fluid from the device through the second end of the fluid passageway, forming a settled bed of loaded affinity sorbent particles having bound target analyte;
adding a washing solution to the reservoir, the washing solution causing unbound substances to be removed from the loaded affinity sorbent particles in the settled bed, without removing the bound target analyte;
removing the washing fluid from the device through the second end of the fluid passageway, thereby removing unbound substances from the settled bed;
adding an elution fluid to the reservoir, the elution fluid causing the target analyte to become unbound from the loaded affinity sorbent particles in the settled bed; and
removing the elution fluid from the device through the second end of the fluid passageway, thereby removing purified target analyte from the settled bed.

2. The method of claim 1, wherein the dispersing is performed by shaking the device on a shaker device, by using a vortex mixer, or by repeatedly aspirating and dispensing the sample fluid and the affinity sorbent particles.

3. The method of claim 1, wherein the sample fluid, the washing fluid, and the elution fluid are removed from the device by centrifugation, by applying a vacuum to the second end of the fluid passageway, by applying a positive pressure to the first opening of the reservoir, or a combination thereof.

4. The method of claim 1, further comprising adding a conditioning buffer to the reservoir of the device and removing the conditioning buffer from the device through the second end of the fluid passageway prior to adding the sample fluid.

5. The method of claim 1, (a) wherein the first opening for receiving fluids is capped, (b) wherein the second end of the fluid passageway is capped, or (c) wherein the first opening for receiving fluids is capped and the second end of the fluid passageway is capped.

\* \* \* \* \*